(12) United States Patent
Compton et al.

(10) Patent No.: US 11,235,888 B2
(45) Date of Patent: Feb. 1, 2022

(54) POWER DISTRIBUTION SYSTEM

(71) Applicant: GE Aviation Systems Limited, Cheltenham (GB)

(72) Inventors: Russell Mark Compton, Droitwich Spa (GB); John Oliver Collins, Cheltenham (GB); Peter James Handy, Cheltenham (GB)

(73) Assignee: GE Aviation Systems Limited, Cheltenham (GB)

( * ) Notice: Subject to any disclaimer, the term of this patent is extended or adjusted under 35 U.S.C. 154(b) by 192 days.

(21) Appl. No.: 16/509,621

(22) Filed: Jul. 12, 2019

(65) Prior Publication Data

US 2020/0017235 A1 Jan. 16, 2020

(30) Foreign Application Priority Data

Jul. 13, 2018 (GB) .................................. 1811534
Dec. 13, 2018 (GB) .................................. 1820343

(51) Int. Cl.
*B64D 47/00* (2006.01)
*H02H 1/00* (2006.01)
(Continued)

(52) U.S. Cl.
CPC ........... *B64D 47/00* (2013.01); *H02H 1/0007* (2013.01); *H02H 7/22* (2013.01); *H02J 4/00* (2013.01); *B64D 2221/00* (2013.01)

(58) Field of Classification Search
CPC .... B64D 47/00; B64D 15/12; B64D 2221/00; B64D 41/00; B64D 45/00; B60R 16/03; G01R 1/07; G01R 15/16; G01R 15/181; G01R 19/12; G01R 31/008; G01R 31/08; G01R 31/085; G01R 31/11; G01R 31/12; G01R 31/1263; G01R 31/14; G01R 31/50; G01R 31/52; G01R 31/54; G01R 31/58; G05B 19/0428; H02H 1/0007; H02H 1/0015; H02H 3/00; H02H 3/042;
(Continued)

(56) References Cited

U.S. PATENT DOCUMENTS 5,361,183 A 1/1994 Wiese
6,664,656 B2 * 12/2003 Bernier .................. B64D 41/00
307/9.1
(Continued)

FOREIGN PATENT DOCUMENTS

CN 101194217 A 6/2008
CN 102412512 A 4/2012
(Continued)

OTHER PUBLICATIONS

European Patent Office, European Search Report re Application No. 19186117.8-1202, dated Sep. 18, 2019, 8 pages, Munich, Germany.

*Primary Examiner* — Jared Fureman
*Assistant Examiner* — Nicolas Bellido
(74) *Attorney, Agent, or Firm* — McGarry Bair PC (57) ABSTRACT

A power distribution system can include a power source, a power distribution unit, and at least one electrical load supplied by the power distribution unit. A detection circuit can be utilized in the power distribution system to sense or detect the occurrence of an electrical failure within the power or electrical unit.

20 Claims, 7 Drawing Sheets

(51) Int. Cl.
*H02H 7/22* (2006.01)
*H02J 4/00* (2006.01)

(58) Field of Classification Search
CPC .. H02H 3/08; H02H 3/14; H02H 3/16; H02H 3/20; H02H 3/337; H02H 7/00; H02H 7/22; H02H 7/222; H02H 7/261; H02H 7/262; H02H 7/268; H02J 1/08; H02J 1/082; H02J 13/0096; H02J 2300/10; H02J 2310/44; H02J 3/381; H02J 4/00
See application file for complete search history.

(56) References Cited

U.S. PATENT DOCUMENTS

| | | | |
|---|---|---|---|
| 6,876,203 B2 | 4/2005 | Blades | |
| 8,213,136 B2 | 7/2012 | Maddali et al. | |
| 8,412,966 B2 | 4/2013 | Tofigh et al. | |
| 8,810,255 B2 | 8/2014 | Williams et al. | |
| 8,842,398 B2 | 9/2014 | Shipley et al. | |
| 9,236,744 B2 | 1/2016 | Shipley et al. | |
| 9,394,084 B1 | 7/2016 | Edwards et al. | |
| 9,413,162 B2 | 8/2016 | Brouwer et al. | |
| 9,541,582 B2 | 1/2017 | Wendt et al. | |
| 9,561,764 B2 | 2/2017 | Sechrist | |
| 9,762,047 B2 | 9/2017 | Pan et al. | |
| 10,422,826 B2 * | 9/2019 | Handy | G01R 31/11 |
| 10,531,587 B2 * | 1/2020 | Compton | H02B 1/21 |
| 11,005,254 B2 * | 5/2021 | Handy | H02H 3/023 |
| 2013/0293989 A1 * | 11/2013 | Shipley | H05K 1/0268 |
| | | | 361/42 |
| 2016/0152354 A1 | 6/2016 | Gibson et al. | |
| 2018/0017611 A1 | 1/2018 | Radun et al. | |
| 2018/0145498 A1 | 5/2018 | Handy et al. | |
| 2019/0212383 A1 * | 7/2019 | Elliott | H05K 1/181 |
| 2019/0214812 A1 * | 7/2019 | Elliott | H02H 1/0007 |
| 2020/0028349 A1 * | 1/2020 | Elliott | H02H 1/0015 |

FOREIGN PATENT DOCUMENTS

| | | |
|---|---|---|
| CN | 102668301 A | 9/2012 |
| CN | 104584694 A | 4/2015 |
| CN | 106451403 A | 2/2017 |
| CN | 107462790 A | 12/2017 |
| CN | 108075449 A | 5/2018 |
| EP | 2911262 A3 | 12/2015 |
| WO | 2017149301 A1 | 9/2017 |
| WO | 2018033486 A2 | 2/2018 |

* cited by examiner

POWER DISTRIBUTION SYSTEM

CROSS-REFERENCE TO RELATED APPLICATIONS

This application claims the benefit of United Kingdom Patent Application No. 1811534.5, filed Jul. 13, 2018, and United Kingdom Patent Application No. 1820343.0, filed Dec. 13, 2018, both of which are incorporated herein by reference in their entirety.

BACKGROUND

Electrical systems, such as those found in a power distribution system, employ electrical bus bars and miles of wiring for delivering power from electrical power sources to electrical loads. In the event of an electrical arc fault or other failure condition, high currents might be transmitted through a normally nonconductive medium, such as air, with unexpected consequences for the power distribution system at or about the arcing failure point.

BRIEF DESCRIPTION

In one aspect, the present disclosure relates to a power distribution system including a chassis defining an inner surface and an interior, and wherein at least a portion of the inner surface includes a conductive detection layer, at least one power distribution component received within the interior and configured to supply power from a power source to an electrical load and disposed within the interior, and a fault detection circuit. The fault detection circuit further includes a voltage sensor configured to sense a voltage at the conductive detection layer and a controller module communicatively connected with the voltage sensor and configured to receive the sensed voltage at the conductive detection layer, to compare the sensed voltage to a threshold value, and upon satisfaction of the comparison, to indicate an arcing event between the at least one power distribution component and the conductive detection layer of the chassis has occurred.

In another aspect, the present disclosure relates to a method of operating a power distribution system, the method including sensing, by a voltage sensor, a voltage at a conductive detection layer disposed on an inner surface of a chassis housing at least one power distribution component, receiving, by a controller module, the sensed voltage from the voltage sensor, comparing, by the controller module, the sensed voltage to a threshold voltage value, and upon satisfaction of the comparing, disable a supplying of power from a power source to the at least one power distribution component.

DETAILED DESCRIPTION

The described aspects of the present disclosure are directed to an electrical power distribution system, which can be used, for example, in an aircraft. While this description is primarily directed toward a power distribution system for an aircraft, it is also applicable to any environment using an electrical system for transmitting power from a power source to an electrical load.

While "a set of" various elements will be described, it will be understood that "a set" can include any number of the respective elements, including only one element. Also as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured, connected, or connectable to provide, enable, disable, or the like, an electrical connection between respective elements. Non-limiting example power distribution bus connections or disconnections can be enabled or operated by way of switching, bus tie logic, or any other connectors configured to enable or disable the energizing of electrical loads downstream of the bus.

As used herein, a "system" or a "controller module" can include at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

As used herein, a controllable switching element, or a "switch" is an electrical device that can be controllable to toggle between a first mode of operation, wherein the switch is "closed" intending to transmit current from a switch input to a switch output, and a second mode of operation, wherein the switch is "open" intending to prevent current from transmitting between the switch input and switch output. In non-limiting examples, connections or disconnections, such as connections enabled or disabled by the controllable switching element, can be selectively configured to provide, enable, disable, or the like, an electrical connection between respective elements.

Non-limiting aspects of the disclosure can be implemented in any electrical circuit environment. A non-limiting example of an electrical circuit environment that can include aspects of the disclosure can include an aircraft power system architecture, which enables production of electrical power from at least one spool of a turbine engine, preferably a gas turbine engine, and delivers the electrical power to a set of electrical loads via at least one switch. In one example the switch can be in the form of a solid state switch, such as a solid state power controller (SSPC) switching device. One non-limiting example of the SSPC can include a silicon (Si), silicon carbide (SiC) or Gallium Nitride (GaN) based, high power switch. SiC or GaN can be selected based on their solid state material construction, their ability to handle high voltages and large power levels in smaller and lighter form factors, and their high speed switching ability to perform electrical operations very quickly. Additional switching devices or additional silicon-based power switches can also be utilized.

Additionally, as used herein, an "arc," "arcing," "electrical arc," "arcing event," or "arc fault" will refer to an unintended or undesired conduction of electric current across a traditionally non-conductive medium, such as air. For example, in non-limiting instances, a "parallel arc" can include an arcing event at least partially connecting two points which are intended to be insulated from each other. In another non-limiting instance, a "series arc" can include an arcing event in which a conductive medium becomes nonconductive or poorly conductive between two parts of an intended conductive path. Furthermore, an arcing event can include an unexpected power loss regardless of whether there is an obvious arc manifestation (e.g. a visible or visually identifiable occurrence). In another non-limiting instance, a series arc can include an unexpected impedance. While "arc faults" and "electrical arcs" are described herein for understanding, aspects of the disclosure are applicable to any electrical faults, including leakage current faults, dielectric breakdowns, arc faults, or the like.

Additionally, as used herein, the term "satisfies" with respect to a threshold value means that a respective value is equal to or greater than the threshold value, or being within a threshold value range (e.g. within tolerance). It will be understood that such a determination may easily be altered to be satisfied by a positive/negative comparison or a true/false comparison. In one aspect of the disclosure, satisfying a threshold of the aforementioned power characteristics can include falling within a threshold value range, such as between 3.9 V and 4.1 V by way of non-limiting example. Additional thresholds and threshold ranges can be included.

Electrical failures, including electrical arcs, might occur in an environment where, for example, physical defects in an electrical connection cause a permanent or temporary loss in transmission capabilities. Where a physical separation occurs, the voltage difference between each of the separated terminals in addition to a short distance of separation, can allow for an electrical arc to strike between the terminals. In an environment with vibrations, for instance, as in a moving aircraft, a physical defect in an electrical connection might result in intermittent arcing events as the vibrations disconnect and reconnect the electrical connection at the point of the physical defect. In yet another example, an electrical arc might be caused by (or relate to) a loose terminal connection or a drawn series fault.

The exemplary drawings are for purposes of illustration only and the dimensions, positions, order and relative sizes reflected in the drawings attached hereto can vary.

Figure 1:
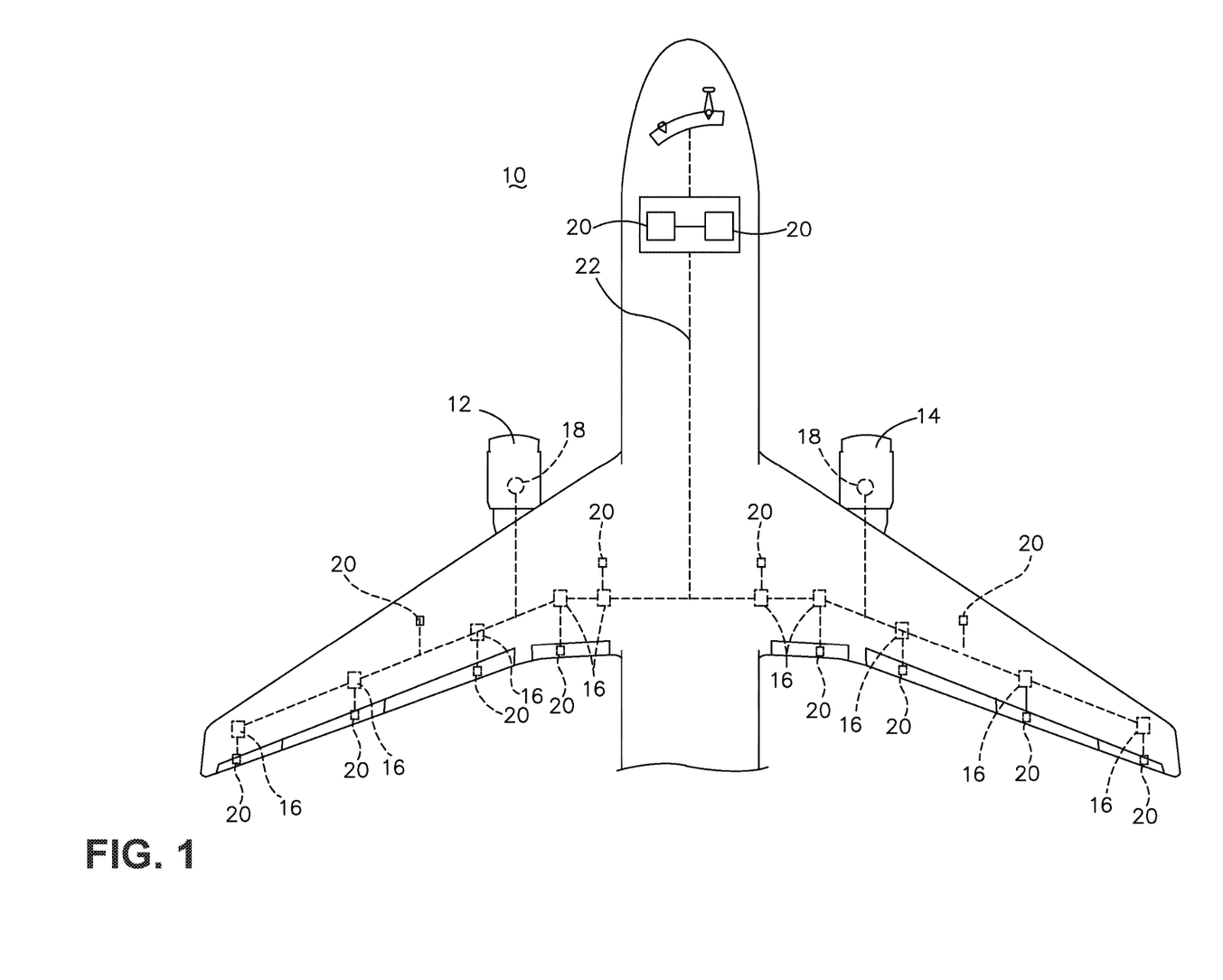
FIG. 1 is a schematic top view of an aircraft including a power distribution system according to various aspects described herein.

As illustrated in FIG. 1, an aircraft 10 is shown having at least one gas turbine engine, shown as a left engine system 12 and a right engine system 14. Alternatively, the power system can have fewer or additional engine systems. The left and right engine systems 12, 14 can be substantially identical, and can further include at least one power source, such as an electric machine or a generator 18. The aircraft is shown further having a set of power-consuming components, or electrical loads 20, such as for instance, an actuator load, flight critical loads, and non-flight critical loads. The electrical loads 20 are electrically coupled with at least one of the generators 18 via a power distribution system including, for instance, power transmission lines 22 or bus bars, and power distribution nodes 16. It will be understood that the illustrated aspect of FIG. 1 is only one non-limiting example of a power distribution system, and many other possible aspects and configurations in addition to that shown are contemplated by the present disclosure. Furthermore, the number of, and placement of, the various components depicted in FIG. 1 are also non-limiting examples of aspects associated with the disclosure.

In the aircraft 10, the operating left and right engine systems 12, 14 provide mechanical energy which can be extracted, typically via a spool, to provide a driving force for the generator 18. The generator 18, in turn, generates power, such as alternating current (AC) or direct current (DC) power, and provides the generated power to the transmission lines 22, which deliver the power to the power distribution nodes 16, positioned throughout the aircraft 10. The power distribution nodes 16 receive the AC or DC power via the transmission lines 22, and can provide switching, power conversion, or distribution management functions, as needed, in order to provide the desired electrical power to the electrical loads 20 for load operations.

Example power distribution management functions can include, but are not limited to, selectively enabling or disabling the delivery of power to particular electrical loads 20, depending on, for example, available power distribution supply, criticality of electrical load 20 functionality, or aircraft mode of operation, such as take-off, cruise, or ground operations. Additional management functions can be included. Furthermore, additional power sources for providing power to the electrical loads 20, such as emergency power sources, ram air turbine systems, starter/generators, batteries, or the like can be included, and substitute for or supplement the power source. It will be understood that while one aspect is shown in an aircraft environment, the disclosure is not so limited and has general application to electrical power systems in non-aircraft applications, such as other mobile applications and non-mobile industrial, commercial, and residential applications.

Figure 2:
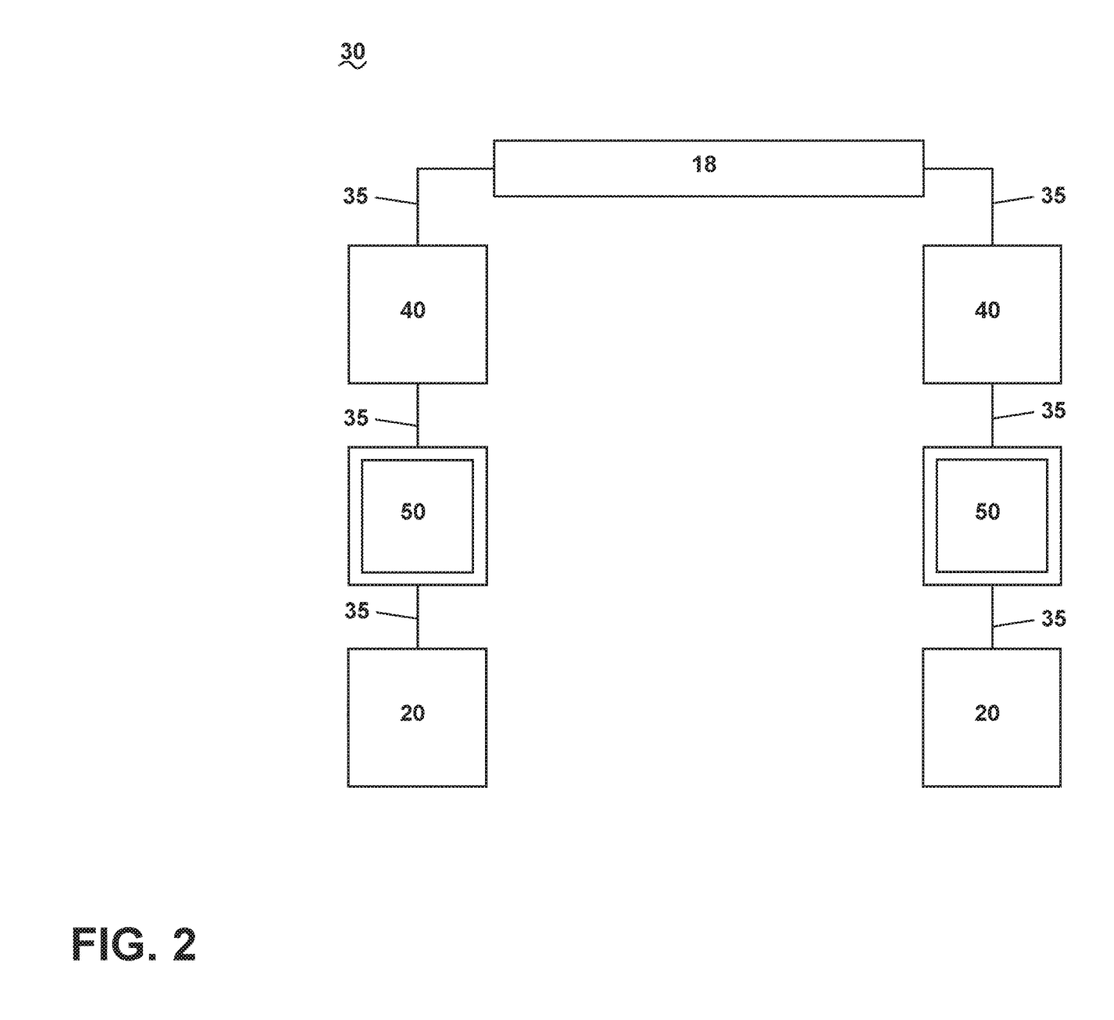
FIG. 2 is a schematic view of the power distribution system of FIG. 1 including a power distribution unit according to various aspects described herein.

FIG. 2 illustrates a non-limiting schematic example of a power distribution system 30 of the aircraft 10. As shown, the power distribution system 30 can include at least one power source shown as the generator 18, an electrical fault detection circuit 40, a power distribution unit (PDU) 50, and an electrical load 20. The generator 18 can supply any amount or form of power, such as AC or DC, and in a non-limiting example can supply 270 V DC for the power distribution system 30.

The detection circuit 40 can be positioned "upstream" of the PDU 50, i.e. at a higher electric potential or closer to the generator 18 compared to the PDU 50. It will be understood that the power distribution system 30 can include other elements not explicitly illustrated such as generators, buses, switches, and the like, or combinations thereof. Further, while two detection circuits 40, two power distributions units 50, and two electrical loads 20 are shown, it will be understood that the exemplary power distribution system 30 can include any number of detection circuits 40, PDUs 50, and loads 20. In addition, conductors 35 such as wires, bus bars, or the like can electrically connect the generator 18 to each detection circuit 40, power distribution unit 50, and electrical load 20. While the detection circuit 40 is shown and described upstream of the PDU 50, non-limiting aspects of the disclosure can be included wherein the detection circuit 40 is included with the PDU 50, or in another power distribution system component upstream of the PDU 50.

Figure 3:
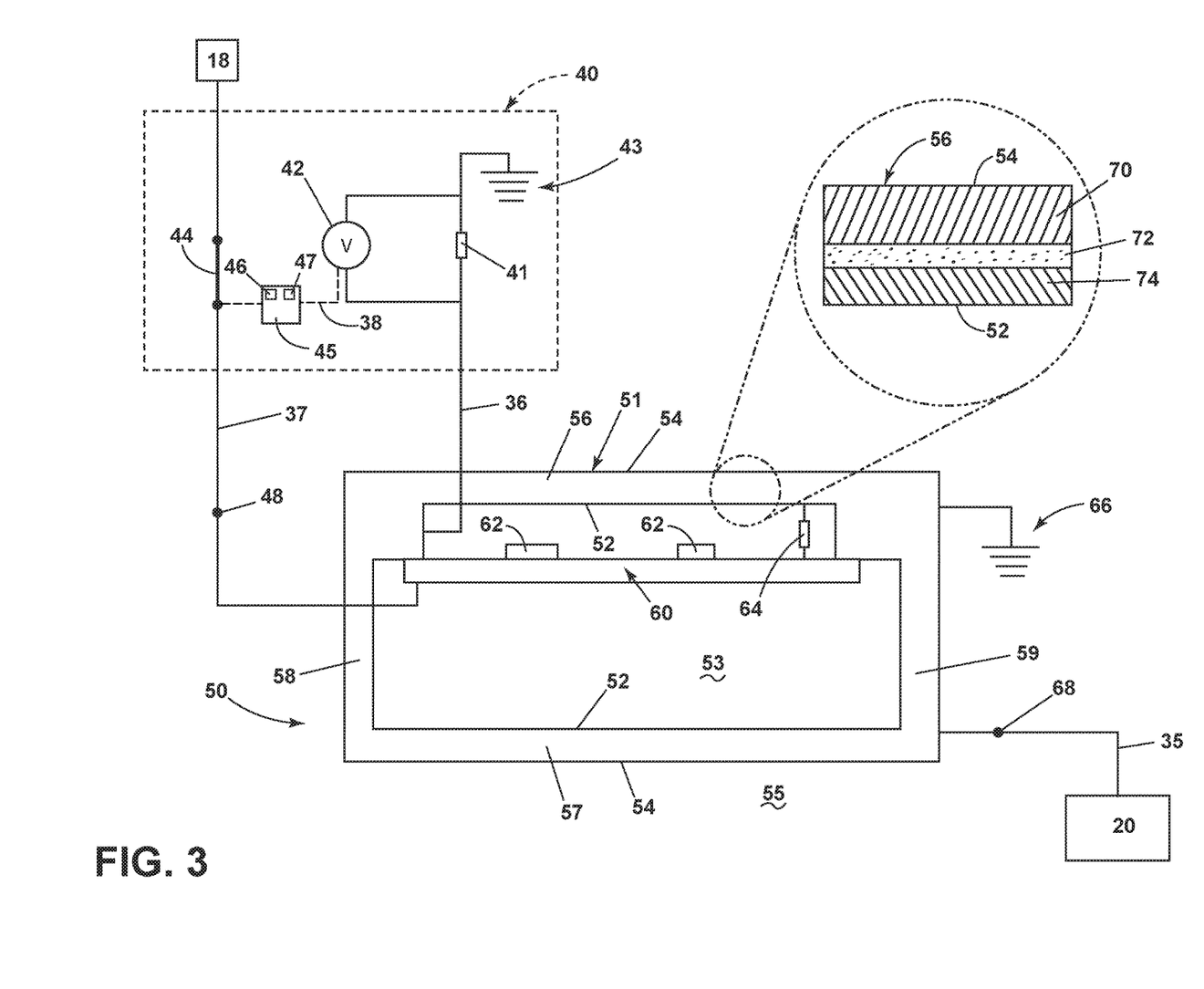
FIG. 3 is a schematic side view of the power distribution unit of FIG. 2 according to various aspects described herein.

FIG. 3 illustrates the detection circuit 40 and the power distribution unit 50 of the power distribution system 30 in further detail. The PDU 50 can include a chassis 51 formed of any suitable material for the environment, including aluminum, steel, graphite, or a composite material, in non-limiting examples. The chassis 51 can have an inner surface 52 defining an interior 53 and an outer surface 54 defining an exterior 55. In the illustrated example the chassis 51 includes a top wall 56, a bottom wall 57, and opposing sidewalls 58, 59. While not shown in FIG. 3, the chassis 51 can also include front and back walls such that the interior 53 can be partially or completely enclosed. Further, any of the walls 56, 57, 58, 59 can be removable to selectively provide access to the interior 53.

At least power distribution component, illustrated as a printed circuit board 60, can be housed within the interior 53 of the chassis 51, such as via a set of rails or mounting hardware as appropriate. The printed circuit board 60 will also be referred to herein as a "PCB" 60 or a "circuit board" 60. In an alternate example, another power distribution component having a contactor and discrete wiring can be used in place of, or in combination with, the printed circuit board 60. In a non-limiting example, the PCB 60 can be included in a power switching device or another power supply within the chassis 51. In addition, the PCB 60 can include circuit elements shown as solid state switching components (SSPCs) 62 that operate to selectively supply power to the downstream electrical load(s) 20, shown schematically as a single electrical load 20.

An electrically resistive or high-impedance component, illustrated as a resistor 64, can be electrically coupled between a powered portion of the PCB 60 and the chassis 51. In an example where the PDU 50 supplies AC power, any suitable component having sufficient impedance can be utilized in place of the resistor 64. In the example shown, the resistor 64 can be coupled to the inner surface 52 of the chassis 51. The outer surface 54 of the chassis 51 can be electrically connected to an electrical ground 66. Non-limiting aspects of the electrical ground 66 can include a common electrical grounding, an earth ground, or a common frame such as the aircraft frame. In addition, an exemplary power output 68 of the power distribution unit 50 is illustrated where the PDU 50 connects to the electrical load 20 via a conductor 35. It will be understood that the exemplary power output 68 can represent one or multiple power outputs from the PDU 50. For example, the PDU 50 can include a plurality of power outputs electrically connected to a set of electrical loads 20, and the exemplary power output 68 as shown can represent the summated power provided to the set of electrical loads 20. In another example, the exemplary power output 68 can represent a power output to each electrical load 20 in a set of multiple electrical loads 20 connected to the PDU 50.

The detection circuit 40 can be supplied with power from the generator 18 and electrically coupled to the power distribution unit 50 by way of respective first and second conductors 36, 37. The first conductor 36 can be electrically coupled to the inner surface 52 of the chassis 51, and the second conductor 37 can be electrically coupled to the PCB 60 to supply power to the PCB 60. The exemplary detection circuit 40 is shown including a resistor 41, a voltage sensor 42, an electrical ground 43, a switching element 44, and a controller module 45. In addition, the controller module 45 can further include a processor 46 and memory 47. The controller module 45 can be configured or adapted to execute controllable operations, for instance, in response to received signals, data, or the like, and generate control commands, signals, or another enabling or operative functional output. For instance, as shown, the controller module 45 can be configured or adapted to operably control the switching functionality of the switching element 44.

In addition, an exemplary power output 48 of the detection circuit 40 is shown. In this sense, the power supplied by the generator 18 is controllably supplied the power distribution unit 50, by way of the detection circuit 40 when the switching element 44 is closed. When the switching element 44 is open, no power is supplied via the power output 48 to the PDU 50.

FIG. 3 further illustrates a zoomed portion of the chassis 51, where it is further contemplated in a non-limiting example that at least one wall of the chassis 51, such as the top wall 56, can include a base layer 70, a non-conductive insulation layer 72, and a conductive detection layer 74. The composition of the base layer 70 is not germane to the disclosure, and can comprise a conductive material. The insulation layer 72 can be formed of any suitable insulating material such as ceramics, polymers, fiberglass, composites, and the like. The detection layer 74 can be formed of an electrically conductive material, including metals or nanofoams in non-limiting examples. The insulation layer 72 can be positioned between the base layer 70 and the detection layer 74, and can electrically insulate the detection layer 74 from the base layer 70. In one example the detection layer 74 can be formed by additive manufacturing processes such as electrodeposition over the insulation layer 72. In another example the detection layer 74 can be manufactured or formed prior to coupling with the insulation layer 72, such as by way of attachment hardware. The detection layer 74 is electrically connected to the first conductor 36.

It is further contemplated that any or all of the walls 56, 57, 58, 59 can include the layered composition of the zoomed portion 31. In another non-limiting example, only walls openly exposed to power components, such as the SSPCs 62, or only walls likely to be struck with arcing events, can comprise the layered composition of the zoomed portion 31. In another non-limiting example, all inner surfaces 52 within the chassis 51 can be coupled to insulation and detection layers 72, 74.

In operation, power supplied by the generator 18 can be utilized by the printed circuit board 60. The resistor 64 coupled to the PCB 60 can bias the detection layer 74 to a non-zero voltage while the base layer 70 of the top wall 56, electrically insulated from the detection layer 74, is grounded via the electrical ground 66. Put another way, the resistor 64 can act as one part of a voltage divider that is completed by the external detection circuit 40. In this manner the detection circuit 40 can sense, via the first conductor 36 and voltage sensor 42, an output voltage from the detection layer 74. The output of the voltage sensor 42 can be provided to the controller module 45 by way of communication line 38. The voltage sensor 42 can sense or measure the voltage across the resistor 41, and communicate the sensed or measured voltage to the controller module 45. The voltage sensed or measured by the voltage sensor 42 can be compared by the controller module 45 to values indicative of an electrical failure, such as an electrical arcing event. Upon satisfaction of the comparison, the controller module can determine that an electrical fault is present. For example, an arcing event or electrical short circuit can change the voltage sensed or measured by the voltage sensor 42 to zero, or may alternate the voltage between zero and a non-zero value when arcing event occurs. Based on the sensed voltage, and upon satisfaction of the comparison, the controller module 45 can determine that an electrical fault such as an arcing event has occurred in the PDU 50.

Figure 4:
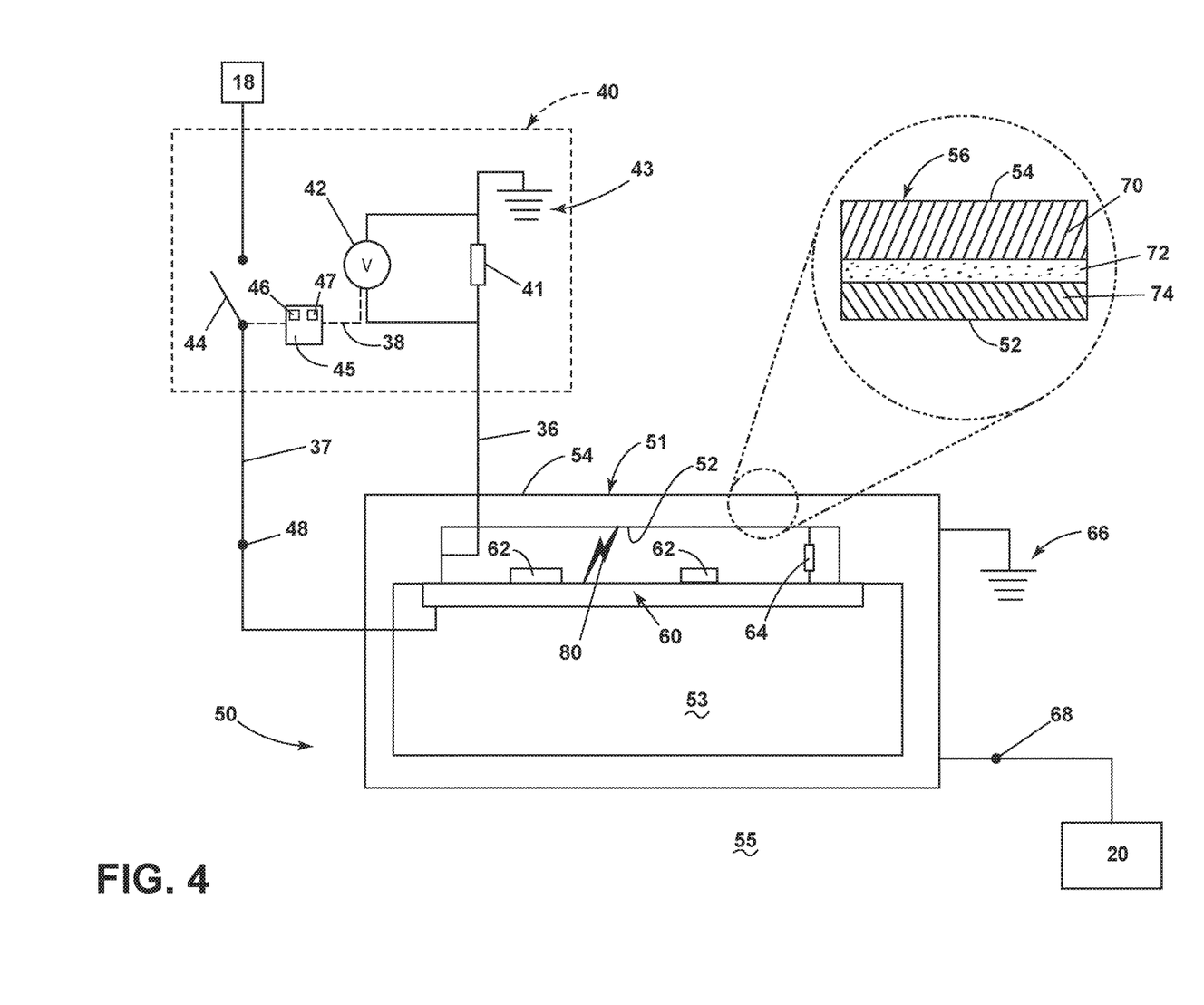
FIG. 4 is a schematic side view of the power distribution unit of FIG. 3 during an electrical fault according to various aspects described herein.

FIG. 4 illustrates a representative arc fault occurring in a segment of the power distribution unit 50. The representative arc fault is shown as a parallel arc fault 80, which can occur when unwanted or undesirable electric current travels between the PCB 60 and the chassis 51. The specific position of the parallel arc fault 80 illustrated is merely one non-limiting example of a schematic arcing event. Aspects of the disclosure can be included wherein arc faults anywhere on a conductive connection can be detected, identified, and the like, in accordance herein, and the actual position of the arc fault.

In the example shown, the parallel arc fault 80 is established between the PCB 60 and the detection layer 74 on the chassis top wall 56. In such a case, the voltage sensor 42 in the detection circuit 40 can sense the output voltage from the PDU 50, perform a comparison as described above, and determine that the parallel arc fault 80 is occurring.

In response to determining an arcing event has or is occurring, the controller module 45 can supply, generate, or otherwise command the switching element 44 to open, ceasing or preventing the supply of power to the PDU 50, and extinguishing the arcing event. The controller module 45 can also be configured to determine an error or fault based on a change or a rate of change in the sensed signal, such as a sensed output voltage increasing by more than 20 V or decreasing by more than 5 V in fewer than 1 second, in non-limiting examples. In another example, in response to determining an arcing event has occurred or is occurring, the controller module 45 can also provide an indication to a pilot or operator alerting them to the arcing event. Such an indication could be in the form of a text or other visual display, or in the form of an audible alert, in non-limiting examples.

In one non-limiting example, the generator 18 can supply 270 V to the printed circuit board 60 and a predetermined maximum voltage for the detection circuit 40 can be 50 V. In the absence of any arc faults, a "nominal" or otherwise standard sensed voltage or signal can be 20 V. During occurrence of the parallel arc fault 80, wherein a completed path is formed between the detection layer 74 and the PCB 60, the sensed signal by the detection circuit 40 can be 250 V. The controller module 45 can sense the output voltage and perform a comparison with the predetermined maximum value. Based on the comparison, the controller module 45 can determine that the parallel arc fault 80 is occurring based on the sensed signal or change in sensed signal, and can also open the switching element 44 to prevent the supply of power to the power distribution unit 50.

Figure 5:
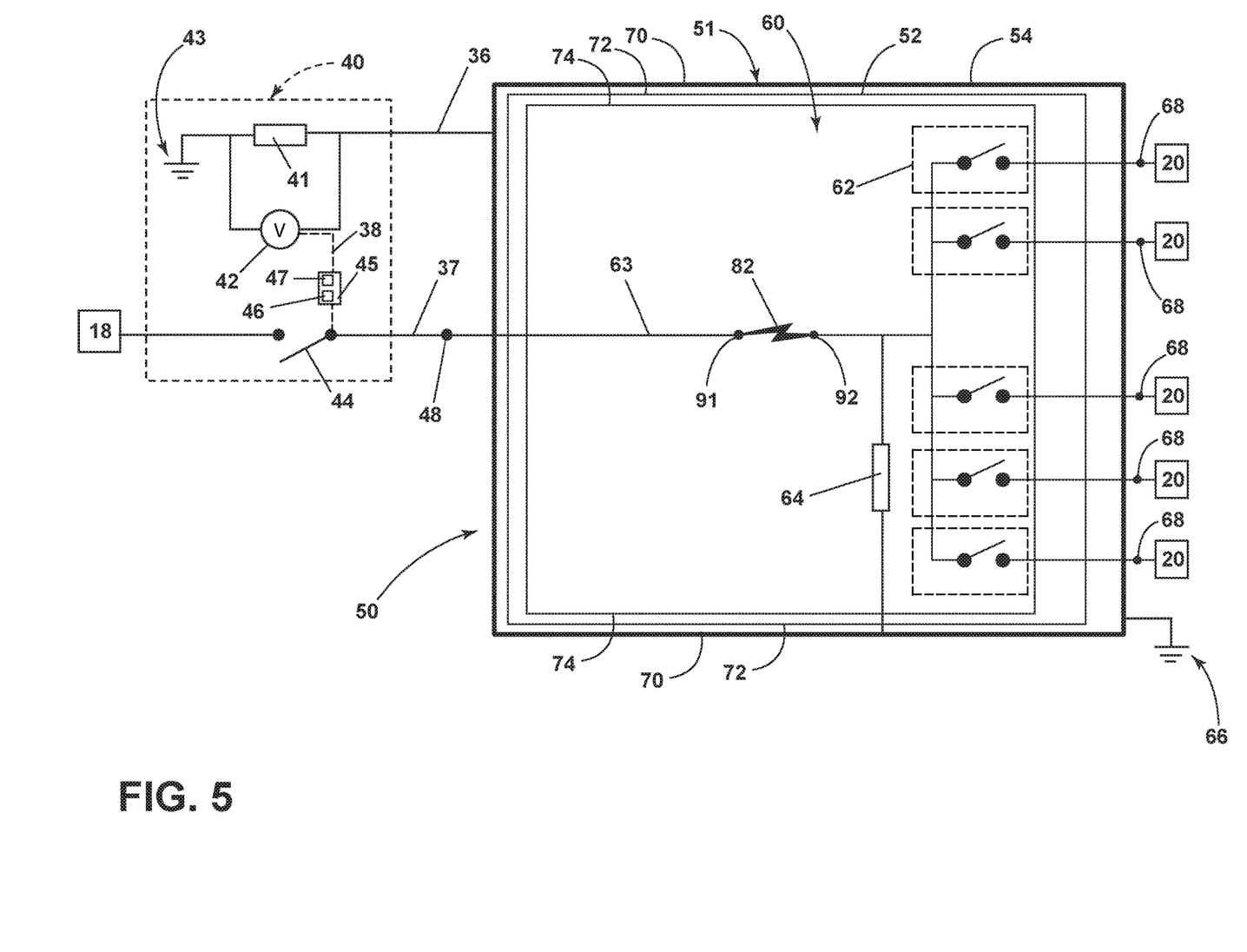
FIG. 5 is a schematic top view of the power distribution unit of FIG. 3 during another electrical fault according to various aspects described herein.

Turning to FIG. 5, the power distribution unit 50 is shown in a schematic top-down view wherein another representative arc fault is illustrated as occurring in a segment of the PDU 50. In this example, the representative arc fault is shown as a series arc fault 82 occurring downstream of the power output 48 and upstream of an electrical load 20. In the illustrated example, the PDU 50 supplies power to a plurality of electrical loads 20 via a corresponding plurality of power outputs 68. Optionally, the PDU 50 can include a corresponding plurality of switches, shown schematically as the SSPCs 62, electrically coupled to the plurality of electrical loads 20 to selectively provide power to the electrical loads 20. In addition, the resistor 64 can optionally be positioned as far downstream of the power output 48 as possible while still being upstream of the SSPCs 62. In another non-limiting example, the resistor 64 can be positioned downstream of the SSPCs 62. It can be appreciated that positioning the resistor 64 as far downstream of the power output 48 as possible can provide for the greatest benefit in detecting the series arc fault 82.

In addition, while the schematic view of FIG. 2 does not show a large conductor 35 length or span between the generator 18 and the PDU 50 or electrical load 20, in a non-limiting aspect of an actual aircraft 10 environment, the conductor 35 length or span between the generator 18 and the PDU 50 or the electrical load 20 can be a long distance, on the order of meters.

The series arc fault 82 can occur between first and second locations 91, 92 of a conductor 63 in the printed circuit board 60. For example, if a break has developed in the conductor 63 between the first location 91 and the second location 92, arcing can occur as illustrated by the series arc fault 82. In such a case, the sensed signal by the detection circuit 40 can be below a predetermined minimum value, such as a sensed signal of 5 V with a predetermined minimum value of 10 V and a "nominal," standard, or expected value of 15 V during normal operation, in a non-limiting example. In another example the sensed signal can drop by an amount between 10V and 20V over a time interval of less than 1 second due to the series arc fault 82. Upon detection of the sensed signal or change in sensed signal, the controller module 45 can determine that the series arc fault 82 is occurring. The controller module 45 can also open the switching element 44 to prevent the supply of power to the PDU 50.

Figure 6:
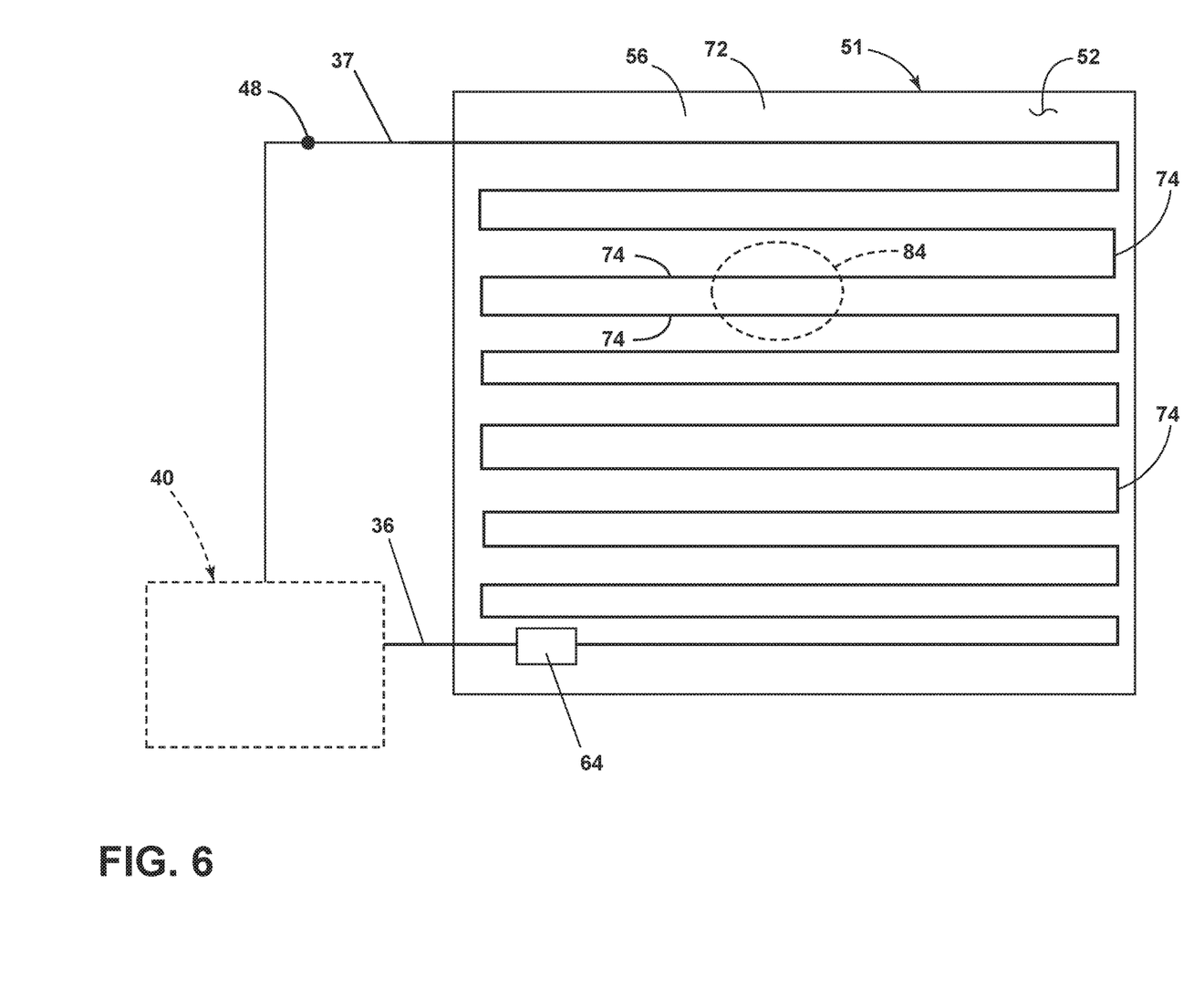
FIG. 6 is a schematic bottom view of a portion of the power distribution unit of FIG. 3 in an alternate configuration according to various aspects described herein.

FIG. 6 illustrates a bottom schematic view of the power distribution unit 50 illustrating another configuration of the detection layer 74 on the inner surface 52 of the top wall 56. It should be understood that the insulation layer 72 can be positioned between the detection layer 74 and base layer 70 (not shown). In addition, the detection circuit 40 has been shown in a simplified form for clarity, and it should be understood that all included components of the detection circuit 40 described above can also be included in the example of FIG. 6.

It is contemplated that the detection layer 74 (and corresponding insulation layer 72) can be arranged over a portion of the inner surface 52 of the chassis 51, such as a serpentine configuration. Other arrangements include square or rounded spiral, or randomly-oriented segments, in non-limiting examples. Further, while the serpentine detection layer 74 is schematically illustrated with significant gaps between adjacent segments, it is contemplated that any size, arrangement, or spacing of the detection layer 74 can be utilized. In a non-limiting example, detection layer 74 segments can be separated by a distance of 1 mm or smaller.

By way of example, an arcing event occurring in the PCB 60 can quickly produce a significant amount of heat in a region 84 overlapping at least a portion of the detection layer 74. The amount of heat produced can, in some circumstances, be sufficient to deform or cause a break in a localized region of the continuous detection layer 74. It should also be understood that heating of the region 84 can also occur due to resistive heating, such as that resulting from a poor electrical connection or excessive electrical current in the region 84. In this sense, the detection layer 74 can include a heat deformable layer. In addition, the arcing event can cause heat to transfer directly to the chassis 51 before the controller module 45 opens the switching element 44.

In the illustrated example, the heated region 84 due to arcing is shown on the inner surface 52 of the chassis 51. In an example where sufficient heat is produced in the heated region 84 to produce damage to the inner surface 52, the detection layer 74 in the serpentine configuration can be "broken" or disrupted such that no current can continue to flow through the detection layer 74. It can be appreciated that, compared to an example where a continuous detection layer 74 is utilized, the segmented or serpentine detection layer 74 can provide for additional protection of the chassis 51 during arcing events by breaking a possible conductive path along the detection layer 74. For example, such breaking of a conductive path can cause the output voltage sensed by the voltage sensor 42 to drop to zero, in which case the controller module 45 can determine that an arcing event has occurred as described above.

Figure 7:
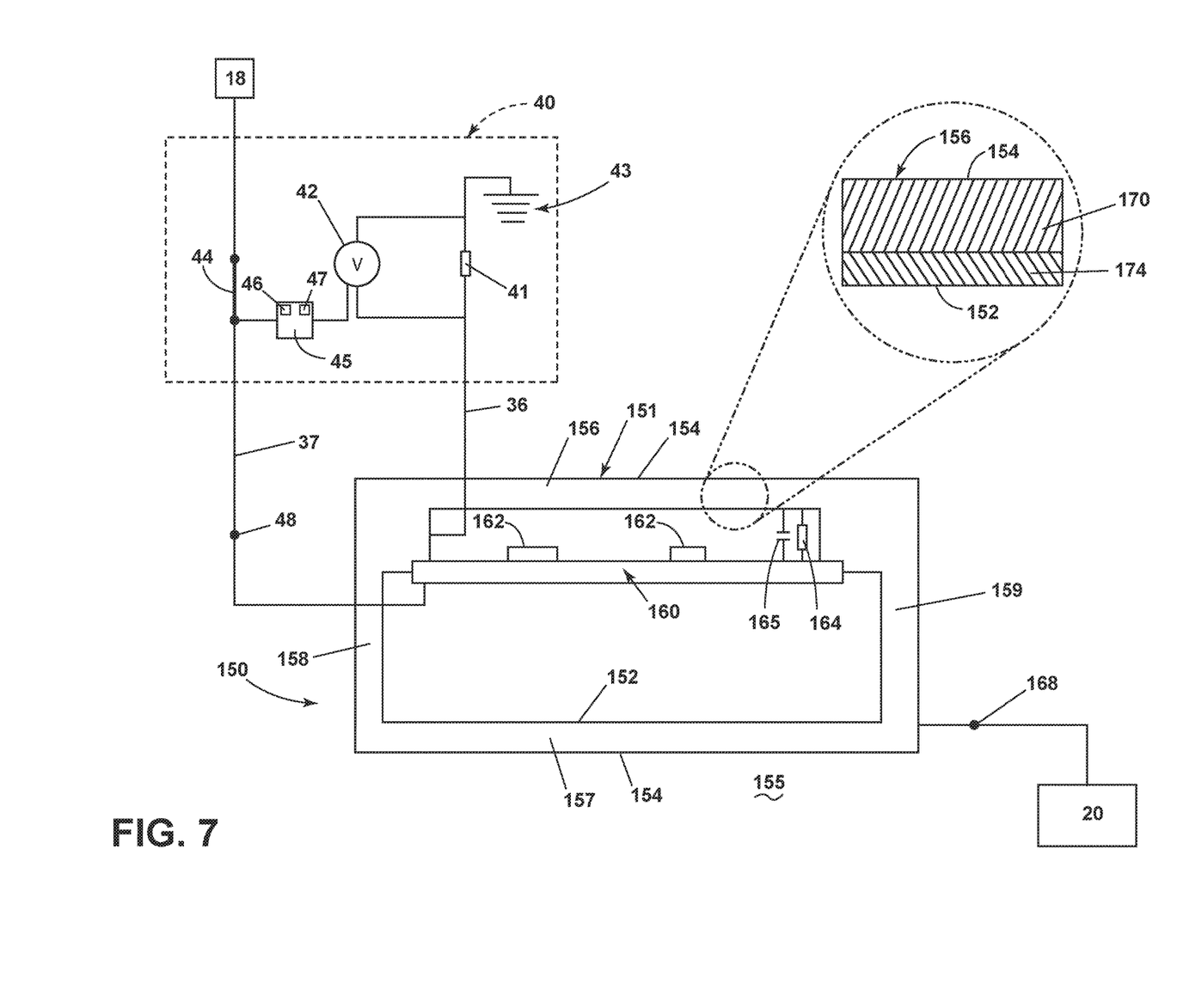
FIG. 7 is a schematic side view of an alternate power distribution unit that can be utilized in the power distribution system of FIG. 1 according to various aspects described herein.

Referring now to FIG. 7, another power distribution unit 150 is illustrated that can be utilized in the power distribution system 30 (FIG. 2). The power distribution unit 150 is similar to the power distribution unit 50; therefore, like parts will be identified with like numerals increased by 100, with it being understood that the description of the like parts of the power distribution unit 50 applies to the power distribution 150, unless otherwise noted.

The PDU 150 can include a chassis 151 having an inner surface 152 defining an interior 153 and an outer surface 154 defining an exterior 155. The chassis 151 further includes a top wall 156, a bottom wall 157, and opposing sidewalls 158, 159. One difference is that the chassis 151 can be formed with a high-impedance material such as a composite material, including polymeric materials or fiberglass.

A printed circuit board 160 can be housed within the interior 153 of the chassis 151. The PCB 160 can also include circuit elements shown as SSPCs 162 that draw power for operation of the circuit board 160. A resistor 164 can be electrically coupled to the PCB 160 and the inner surface 152 of the chassis 151. Another difference is that a capacitor 165 can also be electrically coupled to the PCB 160 and the inner surface 152, forming a parallel electrical connection with the resistor 164. In addition, an exemplary power outlet 168 is also shown upstream of a connected electrical load 20. Another difference is that the chassis 151 can be disconnected from an electrical ground due to its high-impedance material characteristic.

FIG. 7 further illustrates a zoomed portion 32 of the chassis 151, where it is further contemplated that at least one wall of the chassis 151, such as the top wall 156, can include a base layer 170 and a conductive detection layer 174. Another difference is that no insulation layer is needed between the base layer 170 and the detection layer 174 due to the high-impedance characteristic of the chassis 151.

The detection circuit 40 can be electrically coupled to the chassis 151 via the first and second conductors 36, 37. During operation, the detection circuit 40 can sense an output voltage or signal from the PDU 150 and open or close the switching element 144 based on determination of an arcing event as described above. It is contemplated that the addition of the capacitor 165 to the PDU 150 can perform a filtering function against electromagnetic interference for the detection circuit 40 or printed circuit board 60. It can be appreciated that in examples where a traditional aluminum or otherwise conductive material is utilized for the chassis, the conductive nature of the material can provide for electromagnetic shielding without need of additional capacitors.

Aspects of the present disclosure provide for the detection of electrical faults or arcing events in a power distribution system. The technical effect is that the above-described aspects enable the detecting or confirming of electrical faults in a circuit, and providing indication or remediation of such faults. One advantage is that the above described aspects provide for active detection of arcing electrical faults, and power can be selectively supplied or not supplied to a power distribution unit based on determination of an arcing event. As arc faults can produce large amounts of heat in a short amount of time, fast detection or remediation of such faults can increase the longevity of components within the power distribution system.

It can also be appreciated that aspects of the present disclosure provide the ability to detect internal arc faults before they can propagate and affect other electrical systems, including other aircraft systems in an exemplary aircraft environment. Provision of a failure signal to an upstream unit or component (e.g. the detection circuit) can allow for the affected unit (e.g. the PDU) to be electrically isolated and halt the electrical failure progression. In environments utilizing high power or high voltage systems, such electrical isolation can provide for increased safety in operation.

To the extent not already described, the different features and structures of the various aspects can be used in combination, or in substitution with each other as desired. That one feature is not illustrated in all of the aspects is not meant to be construed that it cannot be so illustrated, but is done for brevity of description. Thus, the various features of the different aspects can be mixed and matched as desired to form new aspects, whether or not the new aspects are expressly described. All combinations or permutations of features described herein are covered by this disclosure.

Further aspects of the invention are provided by the subject matter of the following clauses:

1. A power distribution system, comprising: a chassis defining an inner surface and an interior, and wherein at least a portion of the inner surface includes a conductive detection layer; at least one power distribution component received within the interior and configured to supply power from a power source to an electrical load and disposed within the interior; and a fault detection circuit comprising: a voltage sensor configured to sense a voltage at the conductive detection layer; a controller module communicatively connected with the voltage sensor and configured to receive the sensed voltage at the conductive detection layer, to compare the sensed voltage to a threshold value, and upon satisfaction of the comparison, to indicate an arcing event between the at least one power distribution component and the conductive detection layer of the chassis has occurred.

2. The power distribution system of any of the disclosed aspects wherein the at least one power distribution component is a solid state power controller.

3. The power distribution system of any of the disclosed aspects wherein the chassis is adapted to hold a set of circuit boards including the at least one power distribution component.

4. The power distribution system of any of the disclosed aspects wherein the conductive detection layer is biased to a predetermined non-zero voltage.

5. The power distribution system of any of the disclosed aspects wherein the threshold value is the predetermined non-zero voltage.

6. The power distribution system of any of the disclosed aspects wherein the conductive detection layer is biased to the predetermined non-zero voltage by an impedance electrically connecting the conductive detection layer with voltage source.

7. The power distribution system of any of the disclosed aspects wherein the voltage source is one of a circuit board received within the interior of the chassis or the at least one power distribution component.

8. The power distribution system of any of the disclosed aspects wherein all inner surfaces include the conductive detection layer.

9. The power distribution system of any of the disclosed aspects wherein, upon satisfaction of the comparison, the controller module is further configured to disable the supplying of power from the power source to the at least one power distribution component.

10. The power distributions system of any of the disclosed aspects wherein the conductive detection layer can include a conductive layer patterned on at least the portion of the inner surface.

11. The power distribution system of any of the disclosed aspects wherein the conductive detection layer includes a serpentine pattern on at least the portion of the inner surface.

12. The power distribution system of any of the disclosed aspects wherein the conductive detection layer comprises a heat deformable layer.

13. The power distribution system of any of the disclosed aspects wherein the heat deformable layer is selected to deform in response to a localized arcing event or in response to resistive heating due to current conducted during an arcing event, and wherein the deforming modifies the sensed voltage at the conductive detection layer.

14. A method of operating a power distribution system, the method comprising: sensing, by a voltage sensor, a voltage at a conductive detection layer disposed on an inner surface of a chassis housing at least one power distribution component; receiving, by a controller module, the sensed voltage from the voltage sensor; comparing, by the controller module, the sensed voltage to a threshold voltage value; and upon satisfaction of the comparing, disable a supplying of power from a power source to the at least one power distribution component.

15. The method of any of the disclosed aspects, further comprising, upon satisfaction of the comparing, providing indication that an arcing event between the at least one power distribution component and the conductive detection layer of the chassis has occurred.

16. The method of any of the disclosed aspects, further comprising biasing the voltage at the conductive detection layer to a predetermined non-zero voltage.

17. The method of any of the disclosed aspects, further comprising disposing the conductive detection layer on the inner surface of the chassis in a geometric pattern.

18. The method of any of the disclosed aspects wherein the geometric pattern is a serpentine pattern.

19. The method of any of the disclosed aspects wherein the conductive detection layer is a heat deformable conductive detection layer.

20. The method of any of the disclosed aspects, further comprising selecting the heat deformable conductive detection layer such that the heat deformable conductive detection layer deforms in response to a localized arcing event or in response to resistive heating due to current conducted during an electrical fault event, and wherein the deforming modifies the sensed voltage at the heat deformable conductive detection layer.

This written description uses examples to disclose aspects of the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A power distribution system, comprising:
   a chassis defining an inner surface and an interior, and wherein at least a portion of the inner surface includes a conductive detection layer;
   at least one power distribution component received within the interior and configured to supply power from a power source to an electrical load and disposed within the interior; and
   a fault detection circuit comprising:
      a voltage sensor configured to sense a voltage at the conductive detection layer;
      a controller module communicatively connected with the voltage sensor and configured to receive the sensed voltage at the conductive detection layer, to compare the sensed voltage to a threshold value, and upon satisfaction of the comparison, to indicate an arcing event between the at least one power distribution component and the conductive detection layer of the chassis has occurred.

2. The power distribution system of claim 1, wherein the at least one power distribution component is a solid state power controller.

3. The power distribution system of claim 1, wherein the chassis is adapted to hold a set of circuit boards including the at least one power distribution component.

4. The power distribution system of claim 1, wherein the conductive detection layer is biased to a predetermined non-zero voltage.

5. The power distribution system of claim 4, wherein the threshold value is the predetermined non-zero voltage.

6. The power distribution system of claim 4, wherein the conductive detection layer is biased to the predetermined non-zero voltage by an impedance electrically connecting the conductive detection layer with voltage source.

7. The power distribution system of claim 6, wherein the voltage source is one of a circuit board received within the interior of the chassis or the at least one power distribution component.

8. The power distribution system of claim 1, wherein all inner surfaces include the conductive detection layer.

9. The power distribution system of claim 1, wherein, upon satisfaction of the comparison, the controller module is further configured to disable the supplying of power from the power source to the at least one power distribution component.

10. The power distributions system of claim 1, wherein the conductive detection layer can include a conductive layer patterned on at least the portion of the inner surface.

11. The power distribution system of claim 10, wherein the conductive detection layer includes a serpentine pattern on at least the portion of the inner surface.

12. The power distribution system of claim 10, wherein the conductive detection layer comprises a heat deformable layer.

13. The power distribution system of claim 12, wherein the heat deformable layer is selected to deform in response to a localized arcing event or in response to resistive heating due to current conducted during an arcing event, and wherein the deforming modifies the sensed voltage at the conductive detection layer.

14. A method of operating a power distribution system, the method comprising:
sensing, by a voltage sensor, a voltage at a conductive detection layer disposed on an inner surface of a chassis housing at least one power distribution component;
receiving, by a controller module, the sensed voltage from the voltage sensor;
comparing, by the controller module, the sensed voltage to a threshold voltage value; and
upon satisfaction of the comparing, disable a supplying of power from a power source to the at least one power distribution component.

15. The method of claim 14, further comprising, upon satisfaction of the comparing, providing indication that an arcing event between the at least one power distribution component and the conductive detection layer of the chassis has occurred.

16. The method of claim 14, further comprising biasing the voltage at the conductive detection layer to a predetermined non-zero voltage.

17. The method of claim 14, further comprising disposing the conductive detection layer on the inner surface of the chassis in a geometric pattern.

18. The method of claim 17, wherein the geometric pattern is a serpentine pattern.

19. The method of claim 14, wherein the conductive detection layer is a heat deformable conductive detection layer.

20. The method of claim 19, further comprising selecting the heat deformable conductive detection layer such that the heat deformable conductive detection layer deforms in response to a localized arcing event or in response to resistive heating due to current conducted during an electrical fault event, and wherein the deforming modifies the sensed voltage at the heat deformable conductive detection layer.

* * * * *